UNITED STATES PATENT OFFICE.

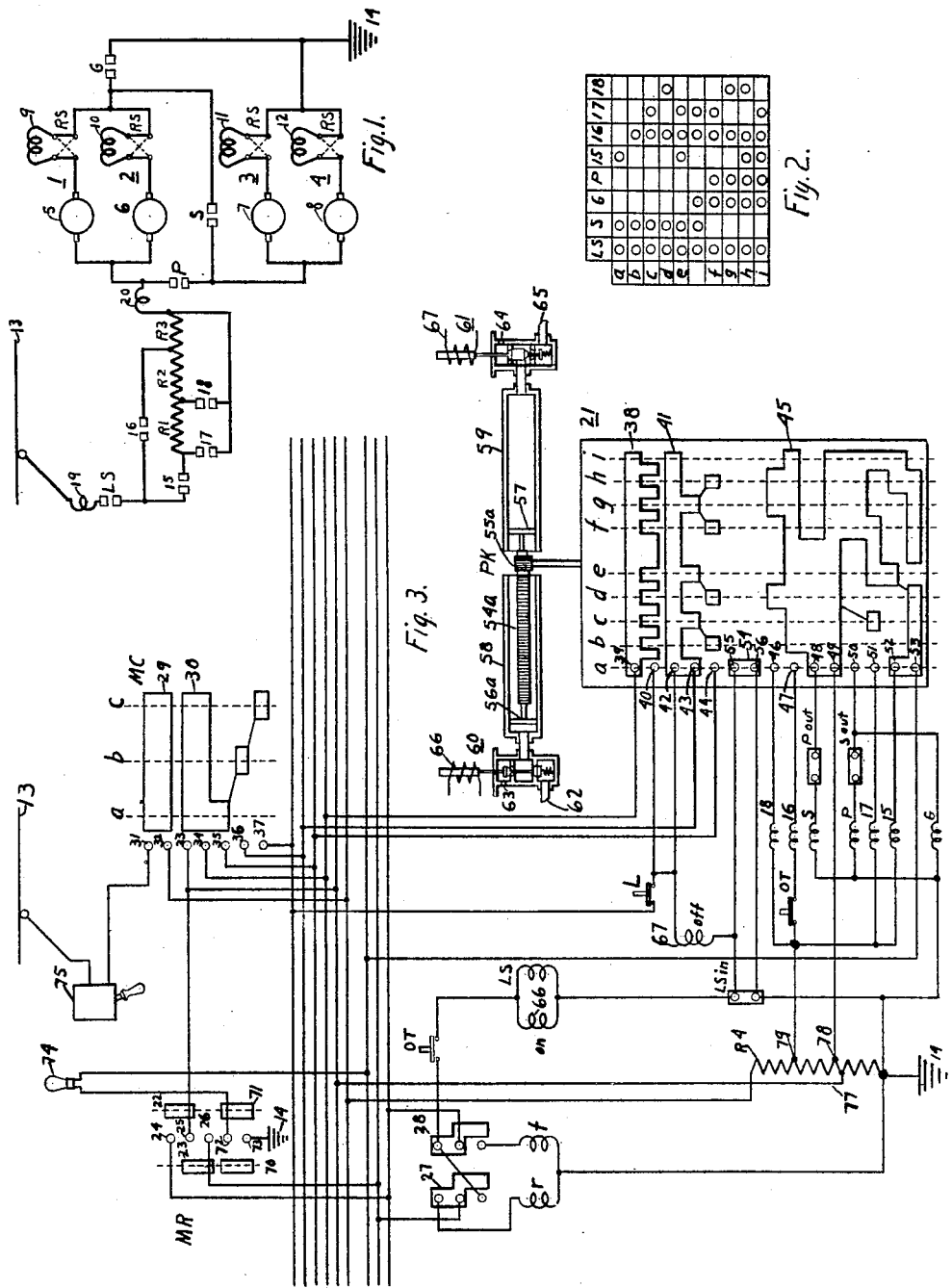

PAUL L. MARDIS AND LYNN G. RILEY, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM.

1,371,566.     Specification of Letters Patent.     Patented Mar. 15, 1921.

Application filed July 12, 1917. Serial No. 180,071.

*To all whom it may concern:*

Be it known that we, PAUL L. MARDIS, a citizen of the United States, and a resident of Wilkinsburg, in the county of Allegheny and State of Pennsylvania, and LYNN G. RILEY, a citizen of the United States, and a resident of Wilkinsburg, in the county of Allegheny and State of Pennsylvania, have invented a new and useful Improvement in Control Systems, of which the following is a specification.

Our invention relates to systems of control and particularly to systems of control for electric railway vehicles.

One object of our invention is to provide a system of control that shall embody simple and reliable means for effecting either automatic acceleration, or acceleration at will, of the motor or motors contained in the system.

Another object of our invention is to provide a system of control of the above-indicated character that shall be provided with a plurality of motors having a plurality of switches for governing the acceleration of the motors in series and in parallel-circuit relation, a main controller having a plurality of contact segments for governing the operation of the motor switches and of the main controller itself, and a master controller for selectively operating the main controller in order to automatically accelerate the motors or to effect acceleration of the motors at will.

Another object of our invention is to provide a control system of the above-indicated character that shall include a three-position master controller for governing the acceleration of the motors, the system being provided with means for accelerating the motors at will when the controller is oscillated between its first two operative positions and with means for automatically accelerating the motors when the controller is moved to its third operative position.

A further object of our invention is to provide a control system that shall comprise a main controller having a set of contact segments for governing the operation of the motors included in the system, a set of contact segments for governing the initial movement of the controller between positions and a set of contact segments for governing the completion of the movement of the controller between positions, whereby the motors may be accelerated at will by oscillating a master controller between two of its operative positions.

In the control systems now in service, wherein the motors are accelerated at will in series and in parallel-circuit relation, it is essential to provide a master controller having a comparatively large number of operative positions and a large number of auxiliary control circuits.

In a control system constructed in accordance with our invention, the acceleration at will of the motors in series and in parallel relation is governed by two positions of a controller, thus effecting a reduction in the number of auxiliary control circuits.

In the accompanying drawing, Figure 1 is a diagrammatic view of the main motor circuits of a system of control embodying our invention; Fig. 2 is a chart illustrating the sequence of operation of the switches illustrated in Fig. 1, and Fig. 3 is a diagrammatic view of the auxiliary control circuits for governing the operation of the switches illustrated in Fig. 1.

Referring to Fig. 1 of the drawing, a plurality of motors 1, 2, 3 and 4, respectively embodying armatures 5, 6, 7 and 8 and field windings 9, 10, 11 and 12, are adapted to be connected across a supply circuit comprising a trolley conductor 13 and a ground conductor 14 and to be governed in various circuit relations by means of switches LS, S, G, P, 15, 16, 17 and 18. A reversing switch RS is provided for reversing the direction of rotation of the motors 1, 2, 3 and 4, and a plurality of resistors R1, R2 and R3 are provided for effecting acceleration of the motors. An overload trip switch OT, having a coil 19, is provided for preventing an excessive current from passing through the motors, and a limit switch L having a coil 20 in the main motor circuit is provided for governing the automatic acceleration of the motors, as will be described later.

Referring to Fig. 3 of the drawing, a main controller 21, which is operated by an apparatus PK, is governed by a master controller MC and is adapted to govern the operation of the various switches illustrated in Fig. 1 of the drawing. A master reverser MR, embodying two contact segments 22 and 23 which are adapted to engage the contact fingers 24, 25 and 26, is adapted to cooperate with the interlock switches 27 and 28 of well-known form for selectively energizing the coils $r$ and $f$ to govern the movements of the reverser switch RS.

The master controller MC embodies two contact segments 29 and 30 which are adapted to engage the contact fingers 31, 32, 33, 34, 35, 36 and 37, when the controller is moved through positions $a$, $b$ and $c$.

The main controller 21 embodies a set of contact segments 38 which are adapted to engage contact fingers 39 and 40 for governing the completion of the movement of the main controller between positions, a set of contact segments 41 which are adapted to engage the contact fingers 42, 43 and 44 for governing the initial movement of the controller between positions, and a set of contact segments 45 which engage contact fingers 46, 47, 48, 49, 50, 51, 52 and 53 for governing the operation of the switches illustrated in Fig. 1 of the drawing. An interlock switch 54, which engages contact fingers 55 and 56, is provided for completing the circuit through the coil of the line switch LS, in position $a$ of the controller 21.

The apparatus PK, which operates the main controller 21, embodies a rack 54a, which engages a pinion 55a mounted on the controller shaft and is provided with pistons 56a and 57 that respectively operate within cylinders 58 and 59. An on-magnet valve 60 is provided for governing the admission and the release of fluid pressure to and from the cylinder 58, and an off-magnet valve 61 is provided for governing the admission and release of fluid pressure to and from the cylinder 59. In the operative position of the magnet valve 60, fluid pressure is admitted from a source 62 to the cylinder 58, and in the released position of the magnet valve, the fluid pressure contained within the cylinder 58 is exhausted through a port 63. In the operative position of the magnet valve 61, the fluid pressure contained within the cylinder 59 is released through a port 64, and in the released position of the magnet valve, the cylinder 59 is connected to the source of fluid pressure 65. The operation of the apparatus PK for effecting a forward movement of the main controller 21 is accomplished by continuously energizing the coil 66 of the magnet valve 60 and intermittently energizing the coil 67 of the magnet valve 61, thus constantly supplying fluid pressure to the cylinder 58 and intermittently releasing the air pressure contained within the cylinder 59, according to the movement of the controller 21 that is desired. In case it is desired to return the controller to the initial position, the coils 66 and 67 of the two magnet valves are simultaneously deënergized, thus releasing the fluid pressure contained within the cylinder 58 and supplying fluid pressure to the cylinder 59.

Two contact segments 70 and 71, which engage contact fingers 72 and 73 in the forward and in the reverse positions of the master reverser MR, are provided for completing a circuit through a signal lamp 74 in various positions of the main controller 21. A switch 75 is provided for connecting the master controller MC to the trolley conductor 13, and the overload trip switch OT that is provided for breaking the circuit through the coil of the line switch LS, the coil of switch 16 and the coil 66 of the on-magnet valve in case an excessive current flows through the motors. A resistor R4 is adapted to be connected across the supply conductors 13 and 14 by means of the master controller MC and is provided with a plurality of taps extending therefrom for supplying a current of reduced voltage to various auxiliary control circuits. The line switch LS is provided with an interlock switch LS-in for establishing a locking circuit through the coil of the line switch, and the switches P and S are respectively provided with interlock switches P-out and S-out for preventing the simultaneous operation of the switches P and S.

Assuming the control apparatus to be in the position illustrated in Figs. 1 and 3 of the drawing, the acceleration of the motors at will from position $a$ to $i$, inclusive, may be effected as follows: When the master controller MC is moved to position $a$, a circuit is completed through the resistor R4 which may be traced from the trolley conductor 13 through the switch 75, contact fingers 31 and 32—which are bridged by the contact segment 29—and the resistor R4 to ground-return conductor 14. A circuit is then completed from the tap 77 extending from the resistor R4 through the contact fingers 24 and 25—which are bridged by the contact segment 22 of the master reverser MR that is assumed to be in the forward position, contact segment 28, overload trip switch OT, coil 66 and the coil of the line switch LS in parallel, and contact fingers 55 and 56—which are bridged by the interlock switch 54—to the ground-return conductor 14. A circuit is completed from the tap 78 of the resistor R4 through contact fingers 48 and 49—which are bridged by the contact segment 45—interlock switch P-out and the coil of the switch S to the ground-return conductor 14. A third circuit is completed from the resistor R4, which may be traced from the tap 79 through the coil of the switch 15, contact fingers 52 and 53—which are bridged by the contact segment 45—signal lamp 74 and the contact fingers 72 and 73—which are bridged by the contact segment 71—to the ground return conductor 14. Thus, the switches LS, S and 15 are closed and the coil 66 of the on-magnet valve 60 is energized, and a circuit is completed through the motors 1, 2, 3 and 4, from the trolley conductor 13 through the coil 19 of the overload trip switch, switch LS, switch 15, resistors R1, R2, R3, coil 20 of the limit switch motors 1 and 2, in parallel, switch S and motors 3 and 4, in parallel, to the ground-return conductor 14.

When the master controller MC is moved to position $b$, a circuit is completed through the coil 67 of the off-magnet valve 61, from the tap 77, extending from the resistor R4, through the contact fingers 33 and 36—which are bridged by the contact segment 30—contact fingers 42 and 43—which are bridged by the contact segment 41—coil 67 and the interlock switch LS-in to the ground-return conductor 14. Thus, the magnet valve 61 is operated and the movement of the main controller from position $a$ to position $b$ is initiated. However, before position $b$ is reached, the contact finger 43 is disengaged from the contact segment 41, and the circuit previously traced through the coil 67 of the off-magnet valve is broken, but, simultaneously, a second circuit is completed by the contact segment 38 through the coil 67. This circuit extends from tap 77 of the resistor R4, the contact fingers 33 and 34—which are bridged by the contact segment 30—contact fingers 39 and 40—which are bridged by the contact segment 38—coil 67, and the interlock switch LS-in to the ground-return conductor 14. Thus, the movement of the main controller from one position to another is initiated by the contact segments 41 and is completed by the contact segments 38.

In position $b$ of the main controller 21, the contact finger 47 engages the contact segment 45, and the contact finger 52 is disengaged therefrom, whereby the switch 15 is released, and the switch 16 is operated to exclude the resistors R1 and R2 from the circuit of the motors.

In order to advance the main controller 21 to position $c$, the master controller is moved from position $b$ to position $a$, whereby a circuit is completed through the off-magnet 67, that may be traced from the tap 77 through the contact fingers 33 and 35—which are bridged by the contact segment 30—contact fingers 42 and 44—which are bridged by the contact segment 41—coil 67 and the interlock switch LS-in to the ground-return conductor 14. Thus, the off-magnet valve is operated and the movement of the main controller from position $b$ to position $c$ is initiated. Before position $c$ is reached, the circuit of the coil 67 is broken by the disengagement of the contact finger 44 from the contact segment 41 and, simultaneously, a new circuit is completed by the engagement of the contact finger 40 with the contact segment 38. The circuit completed by the contact segment 38 through the coil 67 may be traced from the tap 77 of the resistor R4 through the contact fingers 33 and 34—which are bridged by the contact segment 30—contact fingers 39 and 40—which are bridged by the contact segments 38—coil 67 and the interlock switch LS-in to the ground-return conductor 14. When position $c$ of the main controller is reached, the contact finger 40 is disengaged from contact with the contact segment 38 in order to break the circuit of the coil 67 and prevent further movement of the main controller until the master controller MC is again operated.

In order to advance the main controller 21 from the position $c$ to position $d$, the master controller MC is moved from position $a$ to position $b$, whereby a circuit is completed through the coil of the off-magnet valve 67 from the tap 77 of the resistor R4 through the contact fingers 33 and 36—which are bridged by the contact segment 30—contact fingers 42 and 43—which are bridged by the contact segment 41—coil 67 and the interlock switch LS-in, to the ground-return conductor 14. Thus, the movement of the main controller from position $c$ to position $d$ is initiated and is completed by a circuit which is closed through the coil 67 by the engagement of the contact finger 40 with the contact segment 38, in a manner similar to that disclosed in describing the movement of the controller from position $a$ to position $b$ and from position $b$ to position $c$.

In position $d$ of the main controller, the switch 17 is released by reason of the disengagement of the contact finger 51 from the contact segment 45, and the switch 18 is operated by reason of the engagement of the contact finger 46 with the contact segment 45. Thus, the switches 16 and 18 are simultaneously operated, and the resistors R2 and R3 are placed in the motor circuit in parallel.

The movement of the main controller 21 from position $d$ to position $e$, position $e$ to position $f$, position $f$ to position $g$, position $g$ to position $h$ and position $h$ to position $i$ is accomplished in a manner similar to that disclosed in describing the movement of the controller from position $a$ to position $b$ and from position $b$ to position $c$, and a further description thereof is deemed unnecessary.

In position $e$ of the main controller, the switches 15, 16 and 17 are simultaneously operated to exclude the resistors R1, R2 and R3 from the circuits of the motors 1, 2, 3 and 4.

Between positions $e$ and $f$, the transition of the motors from series to parallel-circuit relation is accomplished by means of the well-known shunting transition, and, in positions *g*, *h* and *i* of the main controller 21, the motors are accelerated in parallel-circuit relation. The circuit of the signal lamp 74 is broken in positions *e* and *i* by reason of the dis-engagement of the contact finger 53 from the contact segment 45 and thus, an indication is always given by the lamp 74 when the motors are in a running position, namely, in full-series or in full-parallel position.

In case automatic acceleration of the motors 1, 2, 3 and 4 is desired, the master controller MC is moved to position *c*, whereby the initiation of the movement of the main controller 21 from one position to another is controlled solely by the limit switch L, which in turn, is governed by the current flowing through the motors.

In position *c* of the master controller, a circuit is completed through the coil 67 of the magnet valve that may be traced from tap 77 of the resistor R4 through contact fingers 33 and 37—which are bridged by the contact segment 30—limit switch L, coil 67 and interlock switch LS-in to the ground-return conductor 14. Thus, the magnet valve 61 is operated and the movement of the controller 21 from position *a* is initiated.

If the limit switch L is operated before the controller 21 is moved to position *b*, it will be noted that a circuit for the coil 67 of the off-magnet valve is completed through the contact segment 38 and the contact finger 40 to insure the movement of the controller 21 to the next position. The circuit completed by the contact segment 38 through the coil 67 may be traced from the resistor tap 77 through the contact fingers 33 and 34—which are bridged by the contact segment 30—contact fingers 39 and 40—which are bridged by the contact segment 38—coil 67 and the interlock switch LS-in to the ground-return conductor 14.

When the main controller is moved to position *b*, the circuit of the coil 67 for the off-magnet valve is broken by reason of the disengagement of contact finger 40 from the contact segment 38. Further movement of the controller 21 is prevented until the current flowing through the motors 1 to 4, inclusive, is reduced to a point sufficient to allow the release of the limit switch L and in order to permit the completion therethrough of a circuit for energizing the coil 67. In a similar manner, the main controller is advanced to position *i* in order to operate the motors in full-parallel relation, and further description thereof is deemed unnecessary.

Modifications in the system and arrangement and location of parts may be made within the spirit and scope of our invention and such modifications are intended to be covered by the appended claims.

We claim as our invention:

1. In a system of control, the combination with a motor and a three-position master controller, of means comprising a main controller associated with said master controller for effecting accelerations of the motor at will when the master controller is oscillated between the first two of its operative positions and for effecting automatic acceleration of the motors when the master controller is moved to its third operative position.

2. In a system of control, the combination with a motor and a three-position controller, of means for effecting acceleration of the motor at will when the controller is oscillated between the first two of its positions and for effecting automatic acceleration of the motor when the controller is moved to its third operative position.

3. In a system of control, the combination with a plurality of motors, and a plurality of switches for governing the operation of the motors, of a three-position master controller, and means comprising a main controller associated with the master controller for effecting acceleration at will of the motors in series and in parallel-circuit relation when the master controller is oscillated between its first two operative positions and for effecting automatic acceleration of the motors in series and in parallel-circuit relation when the master controller is moved to its third operative position.

4. In a system of control, the combination with a supply circuit and a plurality of motors connected across the supply circuit, of a three-position controller and means associated with the controller for accelerating the motors at will in series and in parallel-circuit relation when the controller is oscillated between two of its positions and for effecting automatic acceleration of the motors in series and in parallel-circuit relation when the controller is moved to its third operative position.

5. In a system of control, the combination with a plurality of motors and a plurality of switches for governing the acceleration of the motors in series and in parallel-circuit relation, of a controller having three operative positions, means associated with the first two positions of the controller for governing said switches to accelerate the motors at will through a plurality of series and parallel steps and means associated with the third position of the controller for governing said switches to effect automatic acceleration of the motors.

6. In a system of control, the combination with a plurality of motors and a plurality of switches for governing the operation of the motors, of a controller having three operative positions and means for accelerating the motors at will when the controller is oscillated between its first two operative positions and for effecting automatic acceleration of the motors when the controller is moved to its third operative position.

7. In a system of control, the combination with a supply circuit, a plurality of motors, and a plurality of switches for connecting the motors across the supply circuit and for governing the operation thereof, of a three-position master controller, and means comprising a main controller associated with the master controller for controlling the operation of said switches at will to effect acceleration of the motors in series and in parallel-circuit relation when the master controller is oscillated between two operative positions and for controlling the operation of the switches to effect automatic acceleration of the motors in series and in parallel-circuit relation when the master controller is moved to its third operative position.

8. In a system of control for an electric motor, the combination with a main controller having a plurality of contact segments for governing the operation of the motor, of a pneumatic device governed by said contact segments for operating said controller, and means for selectively energizing the contact segments to operate said device and effect automatic acceleration, or acceleration at will, of the motor.

9. In a system of control for an electric motor, the combination with a main controller for governing the operation of the motor, said controller being provided with sets of contact segments for governing the initiation and the completion of the movement between positions of the controller, of a pneumatic device controlled by said contact segments for operating the controller and means for selectively energizing said contact segments to operate the controller at will.

10. In a system of control, the combination with a plurality of motors, a plurality of switches for governing the acceleration of the motors in series and in parallel-circuit relation, and a main controller for governing the operation of said switches and provided with contact segments for governing the initiation and the completion of the movement between positions of the controller, of a pneumatic device controlled by said contact segments for effecting movement of the controller, and means for selectively energizing the various contact segments at will to accelerate the motors in series and in parallel-circuit relation.

11. In a system of control for an electric motor, the combination with a main controller having a set of contact segments for governing the operation of the motor, and two sets of contact segments for governing the initiation and the completion of the movement of the main controller between positions, of a fluid motor selectively operated by said contact segments for operating the main controller and means for selectively energizing the main controller contact segments.

12. In a system of control for an electric motor, the combination with a main controller having a set of contact segments for governing the operation of the motor, a set of contact segments for governing the initial movement of the main controller between positions, and a third set of contact segments for governing the completion of the movement of the main controller between positions, of a fluid motor selectively operated by said contact segments for effecting movement of the main controller, and a master controller for selectively energizing the various segments of the main controller.

13. In a system of control for an electric motor, the combination with a controller having a plurality of contact segments for governing the operation of the motor, of means governed by said contact segments for operating said controller, and means for selectively energizing the contact segments to render said operating means active and effect automatic acceleration, or acceleration at will, of the motor.

14. In a system of control for an electric motor, the combination with a controller for governing the operation of the motor, said controller being provided with sets of contact segments for governing the initiation and the completion of the movement between positions of the controller, of means controlled by said contact segments for operating the controller and means for selectively energizing said contact segments.

In testimony whereof, we have hereunto subscribed our names this 27th day of June, 1917.

PAUL L. MARDIS.
LYNN G. RILEY.